United States Patent [19]

Chen

[11] Patent Number: 5,608,839
[45] Date of Patent: Mar. 4, 1997

[54] SOUND-SYNCHRONIZED VIDEO SYSTEM

[75] Inventor: Homer H. Chen, Lincroft, N.J.

[73] Assignee: Lucent Technologies Inc., Murray Hill, N.J.

[21] Appl. No.: 263,271

[22] Filed: Jun. 21, 1994

Related U.S. Application Data

[63] Continuation-in-part of Ser. No. 210,198, Mar. 18, 1994, abandoned, and a continuation-in-part of Ser. No. 210,819, Mar. 18, 1994.

[51] Int. Cl.$^6$ .................................. G10L 5/06; G10L 9/00
[52] U.S. Cl. ........................ 395/2.44; 395/2.4; 395/2.79
[58] Field of Search ................................ 381/36–41, 51; 395/2, 2.67, 2.69, 2.81, 2.79, 2.4, 2.44; 353/30

[56] References Cited

U.S. PATENT DOCUMENTS

| 4,104,625 | 8/1978 | Bristow et al. | 353/30 |
| 4,305,131 | 12/1981 | Best | 395/152 |
| 4,757,541 | 7/1988 | Beadles | 395/2.63 |
| 4,841,575 | 6/1989 | Welsh | 381/36 |
| 5,327,521 | 7/1994 | Savic et al. | 395/2.81 |

FOREIGN PATENT DOCUMENTS

| 1162492 | 6/1989 | Japan | H04N 7/13 |
| 2231246 | 11/1990 | United Kingdom | G06F 15/72 |
| 2250405 | 6/1992 | United Kingdom | G10L 3/00 |

OTHER PUBLICATIONS

"An Intelligent Facial Image Coding Driven by Speech and Phoneme" by Shigeo Morishima et al., published in Multi-dimensional Signal Processing, Audio and Electroacoustics, vol. 3, on May 23, 1989, Institute of Electrical and Electronic Engineers, pp. 1795–1798.

"Face Animation Scenario Making System for Model Based Image Synthesis" by Shigeo Morishima et al., dated 17 Mar. 1993, the 1993 Picture Coding Symposium Proceedings in the Swiss Federal Institute of Technology, Lausanne, Switzerland.

Wolff et al, "Sensory Fusion: integrating visual and auditory information for recognizing speech;" ICASSP-94, p. 465-8 vol. 1, 19–22 Apr. 1994.

Primary Examiner—Tariq R. Hafiz

[57] ABSTRACT

A stream of unsynchronized audio signal, representing speech and video signal of a speaker, is processed by decoding the signal, memorizing a plurality of visemes corresponding to phonemes in the audio signal, fetching from the plurality visemes corresponding to phonemes in the audio signal, and imparting a synchronism to the video signal and audio signal by applying the fetched visemes to the unsynchronized video signal of the stream in synchronism with corresponding phonemes in the audio signal of the stream. According to an embodiment, the fetching step includes fetching visemes of the lip movement. The system is suitable for use in a videophone.

14 Claims, 2 Drawing Sheets

SOUND-SYNCHRONIZED VIDEO SYSTEM

This is a continuation-in-part of U.S. application of H. H. Chen et al., Ser. No. 08/210,198, now abandoned filed Mar. 18, 1994, and U.S. application of H. H. Chen et al., Ser. No. 08/210,819, currently filed Mar. 18, 1994, both assigned to the same assignee as this application. The contents of these applications are hereby incorporated herein as if fully recited herein.

This application is also related to the application of T. Chen Ser. No. 08/210,529, currently pending, also assigned to the same assignee as this application.

FIELD OF THE INVENTION

This invention relates to synchronizing facial expressions with speech, and particularly to sound-synchronized two-way video communication such as videotelephony.

BACKGROUND OF THE INVENTION

Videophone, teleconferencing, multimedia and other visual communication techniques often produce a delay in the video signal relative to voice signal, particularly at low bit rates. The delayed video sequence is visually annoying in real-time telecommunication services because the voice is not synchronized with the mouth movement or facial expression of the speaker. Inserting extra delay in the speech signal permits synchronization. However the delay occurs in both directions and produces undesirable discomfort.

SUMMARY OF THE INVENTION

According to an aspect of the invention, a stream, of digitized decoded speech and video signals from a speaker, is processed by memorizing a plurality of visemes corresponding to phonemes in the audio signal, fetching visemes corresponding to phonemes in the audio signal, and imparting a synchronism to the decoded video and audio signals by applying the fetched visemes to the unsynchronized video signal of the stream in synchronism with corresponding phonemes in the audio signal of the stream.

According to another aspect of the invention, imparting includes extracting visemes from the instantaneous video signal being decoded and updating the memory of the visemes with the extracted visemes.

These and other features of the invention are pointed out in the claims, objects and advantages of the invention will become evident from the following detailed description when read in light of the accompanying drawings.

DETAILED DESCRIPTION OF PREFERRED EMBODIMENTS

Figure 1:
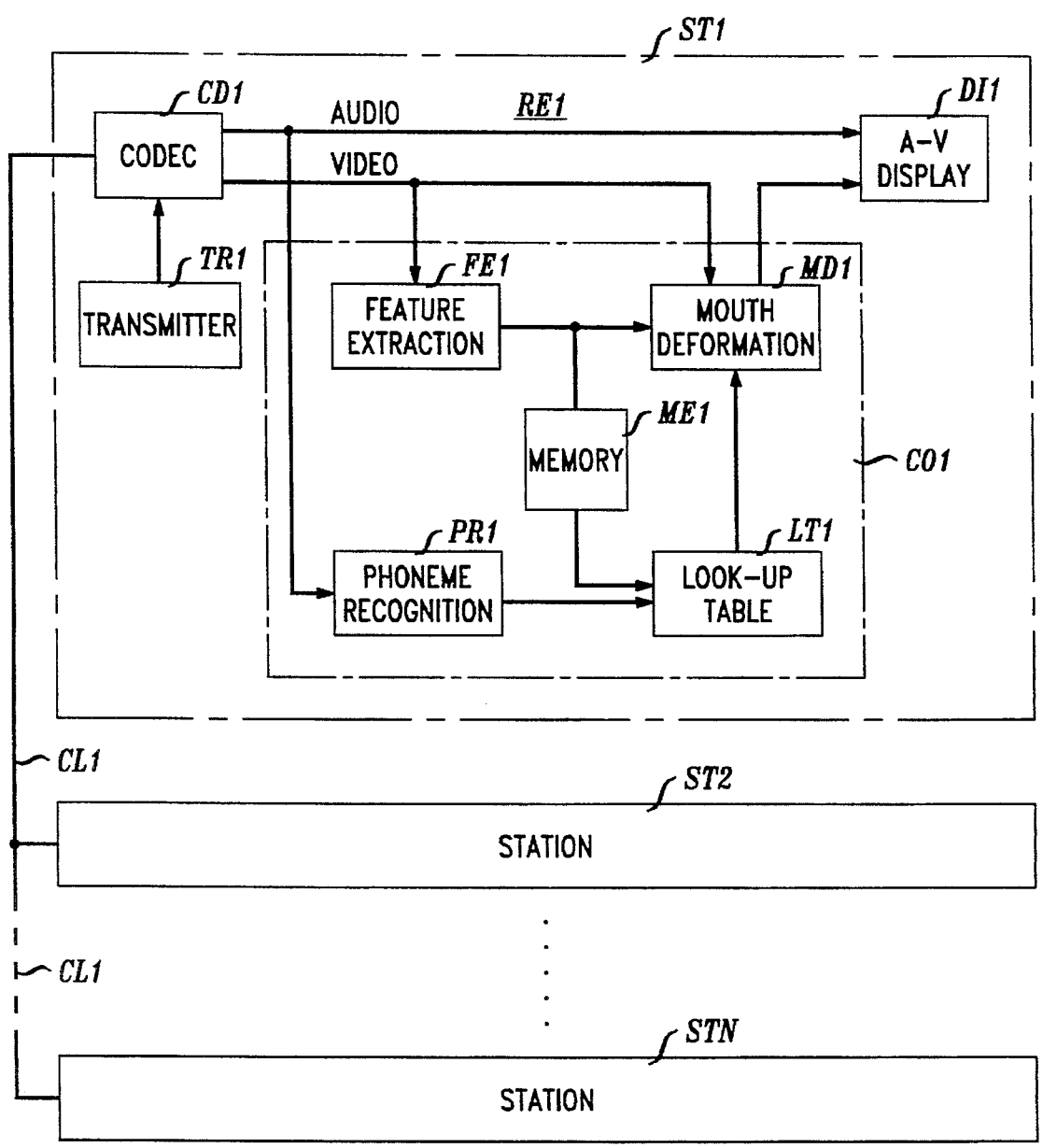
FIG. 1 is a block diagram of a system embodying features of the invention.

FIG. 1 illustrates a system embodying features of the invention and illustrates N stations ST1, ST2 . . . STN communicating digitally with each other through a communication link CL1. The communication link CL1 may be a wire link, wireless, microwave, satellite link, or any other type of link. The stations ST1 to STN may be substantially identical or different.

In the station ST1, a transmitter TR1 includes a camera, microphone, encoder, and conventional transmitting equipment for transmitting digitized audio and visual data such as for a Videophone. The received signal is processed in a receiver generally designated RE1.

In the receiver RE1, a codec (coder-decoder) CD1 decodes the signals to the receiver RE1 and encodes the signals from the transmitter TR1. The codec CD1 also separates the digitized video and audio signals into the digital video and speech components. The audio signal goes directly to an audio-visual (A-V) display DI1.

At the same time, a phoneme recognition module PR1 divides the incoming speech components into recognizable phonemes. A lookup table LT1 stores a number of visemes. A viseme is a sequence of one or more facial feature positions corresponding to a phoneme. Visemes perform the basic units of visual articulatory mouth shapes. A viseme contains mouth parameters which specify the mouth opening, height, width, and protrusion. The lookup table LT1 maps phonemes into visemes which specify the corresponding mouth shape parameters, such as the positions of lips, jaws, tongue, and teeth.

At the video output of the codec CD1, a feature extraction module FE1, extracts mouth information visemes containing the mouth shape and the mouth location from the decoded and delayed video signal. A mouth deformation module MD1 receives inputs from the video signal, the information from the feature extraction module FE1, and the visemes from the lookup table LT1. The mouth deformation module MD1 uses the mouth location generated by the feature extraction module FE1 to locate the mouth in the current frame. It also replaces the information concerning the mouth shape from the feature extraction module FE1 with the mouth shape specified by the viseme from the lookup table LT1. It further performs texture mapping of the mouth image specified in the feature extraction module FE1 to the mouth image specified by the lookup table LT1. The output video is applied to the display DI1 together with the audio signal and produces lip synchronization.

A memory ME1 stores and time stamps mouth information from the feature extraction module FE1 for phoneme-to-viseme identification. It then enters the phoneme-to-viseme identification in the lookup table LT1 to update the lookup table. In one embodiment a microprocessor, not shown, controls the operation of the modules and members of the receiver RE1. The modules and elements FE1, PR1, ME1, MD1, LT1 form a correction arrangement CO1.

According to one embodiment of the invention, any or all of the stations ST2 to STN differ from the station ST1. For example the stations ST2 to STN may be ordinary videophones without the delay correction disclosed herein. According to another embodiment of the invention, one or all of the station ST2 to STN are identical to and operate identical to the station ST1. The Stations ST1 to STN form a system in which the stations communicate with each other. According to an embodiment of the invention, the correction arrangement CO1 is applied as an add-on or retrofit to stations without such correction.

Figure 2:
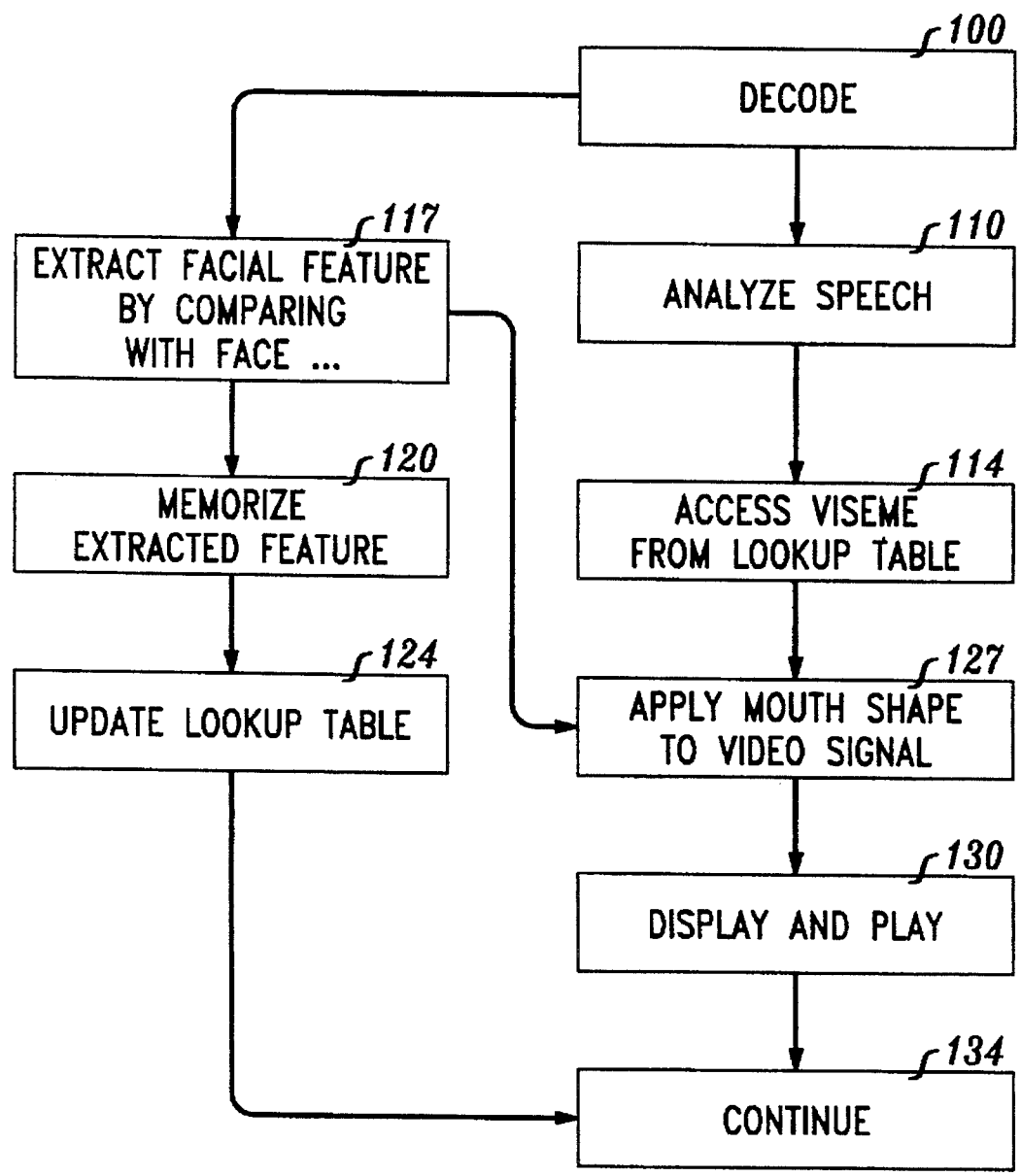
FIG. 2 is a flow diagram of the operation of components of the system in FIG. 1.

FIG. 2 is a flow chart indicating the operation of the receiver RE1 and codec CD1. In step 100 of FIG. 2, the codec CD1 decodes and separates the video and audio signals. In step 110, the phoneme recognition module PR1 analyzes the phonemes of the speech in the audio signal to recognize the current phoneme in the video signal. In step 114, the lookup table LT1 accesses the viseme corresponding to the phoneme from the phoneme recognition module PR1.

In the meantime, during this operation, in step 117, the feature extraction module FE1 extracts the viseme in the decoded video signal by comparing the latter with a face model, and stores it in the memory ME1. In step 120 the memory module ME1 memorizes the extracted feature and in step 124, it updates the visemes in the lookup table LT1. In step 127, the mouth deformation module MD1 applies the mouth shape extracted from the lookup table LT1 to the current video signal. In step 130 the display DI1 displays and plays the video and audio signals. In step 134, the arrangement continues at step 100.

The manner of extracting phonemes from speech sequences, the manner of memorizing visemes corresponding to phonemes from a particular speaker or from a universal speaker, the manner of extracting the correct facial features and applying them to a video signal to deform the mouth, etc., are disclosed in the co-pending U.S. patent application Ser. No. 08/210,198 filed Mar. 18, 1994 and entitled "Library Based Coding of Video Signals" Ser. No. 08/210,819, filed Mar. 18, 1994 and entitled "Audiovisual Dubbing System and Method", both assigned to the same assignee as the present application. Further aspects of the above are also disclosed in U.S. Pat. No. 3,743,391, U.S. Pat. No. 4,975,960, and in a paper presented by Shigeo Morishima et al. at the 1989 ICASSP in Glasgow, UK, entitled "An Intelligent Facial Image Coding Driven By Speech and Phoneme" as well as in the aforementioned U.S. application Ser. No. 08/210,529 of T. Chen, filed Mar. 18, 1994. According to other embodiments of the invention, the techniques and structures described in the aforementioned and the following for various elements and modules such as the phoneme extraction are used herein.

The mouth deformation module MD1 also performs texture mapping. A technique for this purpose is described in a paper by J. Yau and N. Duffy, "A texture mapping approach to 3D facial image synthesis," Comput *Graphics Forum*, no. 7, pp. 129–134, 1988. According to an embodiment of the invention, such texture mapping is used as part of this invention.

Further literature showing the extraction of facial shape and formation from a video signal by speech analysis appears in H. Choi et. al. entitled "Analysis and Synthesis of Facial Expressions in Knowledge Based Coding of Facial Image Sequences" at the *International Conference on Acoustics Speech Signal Processing*, pp. 2737–40 (1991); H. Chen, T. Chen, B. Haskell, A. Kaplan, S. Keshev, E. Petajan, "Audio-assisted video coding/processing," Contribution MPEG 94/084, Mar. 1994; A.E. Kaplan and S. Keshav, "Talking heads made simple," in *Facial Animation Workshop*, University of Pennsylvania, Nov. 1993; and A. Lippman, "Semantic bandwidth compression: Speechmaker," in Proc. *Picture Coding Symposium*, 1981. According to other embodiments of the invention the techniques and means disclosed in the aforementioned and following for various elements and modules are used in the methods and means disclosed herein.

In the phoneme recognition module PR1, an automatic speech recognizer called the BLASR (Bell Labs Automatic Speech Recognition) serves to produce a sequence of phoneme/duration pairs for the input speech. According to an embodiment of the invention, 47 DARPA (Defense Advanced Research Projects Agency) phonemes for the english language and 12 visemes operate in the lookup table, although these could be any number. According to another embodiment of the invention, a larger set of visemes produce finer video rendering. However, the set of 12 visemes suffices for ordinary videophones. A phone group contains phonemes that correspond to similar mouth shapes. According to one embodiment of the invention, speech recognition at the level of individual phonemes is used. According to another embodiment, speech recognition at the level of phone groups, rather than individual phonemes, is used.

Initially, the visemes contain generic mouth shape parameters which are speaker independent. According to an embodiment of the invention, the lookup table LT1 updates its viseme content based on the memory ME1 which holds speaker dependent facial parameters.

According to one embodiment of the invention, a viseme is obtained by using a face model to synthesize the mouth area. The latter covers the lips, jaw, teeth and cheeks. According to an embodiment of the invention, this is accomplished with a wire frame model as disclosed in K. Aizawa, H. Harashima, and T. Saito, "Model-based analysis synthesis image coding system for a person's face," *Signal Processing: Image Communication*, vol. 1, no. 2, Octo. 1989, pp. 139–152. The mouth deformation is controlled by a number of control points around the lips and the normalized positions of these points are given to the visemes. For each deformed surface patch, texture mapping is applied to determine the color of the patch. According to an embodiment of the invention, six control points are used, two at the ends of the mouth, and four in the middle of the upper and bottom edges of the lips.

According to one embodiment of the invention, the module PR1 performs phoneme recognition on the input audio signal to break down the speaker's utterances into a sequence of phonemes. These phonemes are then mapped into visemes which specify the corresponding mouth shape parameters such as the positions of lips, jaw, tongue, and teeth in the table LT1. A generic viseme table is used at the beginning to start the process. Later the mouth parameters are constantly updated according to the actual mouth shape of the speaker extracted from the delayed video image.

In parallel to audio signal processing, the video input images are analyzed to extract the mouth area for modification. This mouth information is stored in a memory of the table LT1 and time stamped for the purpose of phoneme to viseme identification. Such information is used to generate speaker dependent mouth parameters. These position parameters then serve to modify the mouth area in the current frame to produce sound synchronized video.

While the modules and other elements shown as boxes in FIG. 2 may be separable members, according to an embodiment of the invention, any or all the various modules and members of a station are parts of monolithic arrangement such as a chip. According to another embodiment of the invention, the modules and members shown as boxes have their respective functions performed in a microprocessor. As mentioned, various embodiments of the invention employ techniques and means disclosed in the above publications, patents, and applications for the various elements and modules disclosed herein.

The invention synchronizes video and audio signals that had originally been acquired as synchronized signals but had become unsynchronized by processing in videophone, teleconferencing, multimedia, and other visual communication techniques. Delay of the video signal relative to the audio signal, which results in lack of synchronism, can occur during encoding in the transmitter, transmission, and decoding in the receiver.

While embodiments of the invention have been described in detail, it will be evident to those skilled in the art that the invention may be embodied otherwise without departing from its spirit and scope.

What is claimed is:

1. A method of processing a stream of unsynchronized audio and video signals of a speaker, comprising the steps of:

decoding the audio and video signals;

memorizing a plurality of visemes corresponding to phonemes in the decoded audio signal;

fetching visemes corresponding to phonemes in the audio signal; and imparting a synchronism to the decoded video and audio signals by applying the fetched visemes to the unsynchronized video signal of the stream in synchronism with corresponding phonemes in the audio signal of the stream.

2. A method as in claim 1, wherein the memorizing step includes continuously updating the plurality of visemes corresponding to phonemes by continuously extracting visemes from the decoded video signal during the decoding of the audio and video signals and updating the memory of the visemes with the extracted visemes during the decoding of the audio and video signals.

3. A method as in claim 1, wherein the fetching step includes fetching visemes of the lip movement.

4. A communication method, comprising the steps of:

transmitting and receiving streams of synchronized video and audio signals at a multiplicity of stations;

at each of said stations, decoding said signals;

at a plurality of said multiplicity of stations, the steps of:
   memorizing a plurality of visemes corresponding to phonemes in the decoded audio signal;

fetching from the plurality visemes corresponding to phonemes in the audio signal; and imparting a synchronism to the video signal and audio signal by applying the fetched visemes to the unsynchronized video signal of the stream in synchronism with corresponding phonemes in the audio signal of the stream.

5. A method as in claim 4, wherein the memorizing step includes continuously updating the plurality of visemes corresponding to phonemes by continuously extracting visemes from the decoded video signal during the decoding of the audio and video signals and updating the memory of the visemes with the extracted visemes during the decoding of the audio and video signals.

6. A method as in claim 4, wherein the fetching step includes fetching visemes of lip movement.

7. An apparatus for processing a stream of audio and video signals of a speaker, comprising:

a signal decoder responsive to the audio and video signals;

a visime memory responsive to a plurality of visemes corresponding to phonemes in the audio signal from the signal decoder;

a video signal and audio signal synchronizer coupled to said visime memory and responsive to the plurality visemes corresponding to phonemes in the audio signal and to the unsynchronized video signal of the stream so as to impart synchronism of the video signal with corresponding phonemes in the audio signal of the stream.

8. An apparatus as in claim 7, wherein the signal decoder includes an audio output for outputting the audio signal from the stream and a video output for outputting the video signal from the stream.

9. An apparatus as in claim 7, wherein the synchronizer responds to visemes of lip movement.

10. An apparatus as in claim 7, wherein said visime memory is responsive continuously to new visemes corresponding to said phonemes during decoding.

11. A communication system, comprising:

a plurality of stations each having means for transmitting and receiving video and audio signals;

a communications network linking said stations;

a signal decoder at each of said stations;

at a plurality of said stations:
    a visime memory coupled to said decoding means and responsive to a plurality of visemes corresponding to phonemes in the audio signal;

a video signal and audio signal synchronizer coupled to said visime memory and responsive to the plurality visemes corresponding to phonemes in the audio signal and to the unsynchronized video signal of the stream so as to impart synchronism of the video signal with corresponding phonemes in the audio signal of the stream.

12. An apparatus as in claim 11, wherein said signal decoder includes an audio output for outputting the audio signal from the stream and a video output for outputting the video signal from the stream.

13. An apparatus as in claim 11, wherein the synchronizer responds to visemes of lip movement.

14. An apparatus as in claim 10, wherein said visime memory is responsive continuously to new visemes corresponding to said phonemes during decording.

\* \* \* \* \*